United States Patent
Amino

(10) Patent No.: US 12,525,119 B2
(45) Date of Patent: Jan. 13, 2026

(54) VEHICLE EMERGENCY NOTIFICATION APPARATUS AND VEHICLE EMERGENCY NOTIFICATION SYSTEM

(71) Applicant: SUBARU CORPORATION, Tokyo (JP)

(72) Inventor: Yoshiaki Amino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 91 days.

(21) Appl. No.: 18/415,084

(22) Filed: Jan. 17, 2024

(65) Prior Publication Data

US 2024/0273996 A1 Aug. 15, 2024

(30) Foreign Application Priority Data

Feb. 13, 2023 (JP) .................................. 2023-019935

(51) Int. Cl.
| | |
|---|---|
| G08B 1/08 | (2006.01) |
| G08B 25/01 | (2006.01) |
| G08B 25/10 | (2006.01) |
| H04M 11/04 | (2006.01) |

(52) U.S. Cl.
CPC ........... *G08B 25/016* (2013.01); *G08B 25/10* (2013.01); *H04M 11/04* (2013.01)

(58) Field of Classification Search
CPC ..... G08B 25/016; G08B 25/10; H04M 11/04; H04W 4/90; H04W 4/40
USPC ...................................................... 340/539.1
See application file for complete search history.

(56) References Cited

U.S. PATENT DOCUMENTS

| | | | | |
|---|---|---|---|---|
| 10,106,156 | B1* | 10/2018 | Nave | ................. B60W 50/0098 |
| 2002/0103622 | A1* | 8/2002 | Burge | ..................... G16Z 99/00 |
| | | | | 702/183 |
| 2007/0243854 | A1 | 10/2007 | Taki et al. | |
| 2013/0017847 | A1* | 1/2013 | Doherty | .................. H04W 4/00 |
| | | | | 455/567 |
| 2016/0096473 | A1* | 4/2016 | Park | ........................ B60Q 9/00 |
| | | | | 340/436 |

(Continued)

FOREIGN PATENT DOCUMENTS

JP 2006-195580 A 7/2006

*Primary Examiner* — Tai T Nguyen
(74) *Attorney, Agent, or Firm* — TROUTMAN PEPPER LOCKE LLP

(57) ABSTRACT

A vehicle emergency notification apparatus includes a communication device, an information acquisition device, and a vehicle control processor. The communication device transmits an emergency notification from a vehicle to a call center. The information acquisition device acquires one or both of vehicle information regarding the vehicle and occupant information regarding an occupant of the vehicle. The vehicle control processor controls each of the communication device and the information acquisition device, determines whether rescue of the occupant is necessary based on the vehicle information or the occupant information, and generates occupant rescue necessity information indicating whether the rescue of the occupant is necessary. After a phone call is started between the vehicle and the call center via the communication device, the vehicle control processor transmits the occupant rescue necessity information to the call center upon transmission of the emergency notification from the communication device.

15 Claims, 4 Drawing Sheets

(56) References Cited

U.S. PATENT DOCUMENTS

2018/0029553 A1* 2/2018 Hamakami ............ G08B 25/08
2022/0070645 A1* 3/2022 Nagasawa ............ H04M 3/5231
2023/0025199 A1* 1/2023 Tsuge ..................... G08G 1/202

* cited by examiner

VEHICLE EMERGENCY NOTIFICATION APPARATUS AND VEHICLE EMERGENCY NOTIFICATION SYSTEM

CROSS-REFERENCE TO RELATED APPLICATION

The present application claims priority from Japanese Patent Application No. 2023-019935 filed on Feb. 13, 2023, the entire contents of which are hereby incorporated by reference.

BACKGROUND

The disclosure relates to a vehicle emergency notification apparatus and a vehicle emergency notification system.

Japanese Unexamined Patent Application Publication (JP-A) No. 2006-195580 discloses an urgent message system for a vehicle. The urgent message system includes an on-vehicle unit mounted in the vehicle, a portable terminal device such as a portable phone held by an occupant of the vehicle, a help net operation center (hereinafter simply referred to as a center) that receives an urgent message from the portable terminal device, and an urgent message destination, such as a fire station, that receives an urgent message from the center and copes with an urgent situation.

The on-vehicle unit detects a physical condition of the occupant of the vehicle such as a body temperature, a blood pressure, pulsation, brain wave, or the like. The on-vehicle unit compares the detection value with a predetermined threshold to determine whether the physical condition of the occupant is worse than a predetermined threshold. When the physical condition of the occupant is worse than the predetermined threshold, the on-vehicle unit automatically transmits an urgent message to the center via the portable terminal device. At this time, the on-vehicle unit transmits the detection data on the physical condition of the occupant together with the urgent message to the center.

When a telephone conversation with the occupant is unavailable, an operator in the center confirms the detection data transmitted from the on-vehicle unit to recognize a current physical condition of the occupant. When determining, based on the physical condition of the occupant, that an urgent message is to be transmitted to the urgent message destination, the operator transmits the urgent message to an appropriate urgent message destination.

SUMMARY

An aspect of the disclosure provides a vehicle emergency notification apparatus to be applied to a vehicle. The vehicle emergency notification apparatus includes a communication device, an information acquisition device, and a vehicle control processor. The communication device is configured to transmit an emergency notification from the vehicle to a call center. The information acquisition device is configured to acquire one or both of vehicle information regarding the vehicle and occupant information regarding an occupant of the vehicle. The vehicle control processor is configured to control each of the communication device and the information acquisition device, determine whether rescue of the occupant is necessary based on the vehicle information or the occupant information, and generate occupant rescue necessity information indicating whether the rescue of the occupant is necessary. After a phone call is started between the vehicle and the call center via the communication device, the vehicle control processor is configured to transmit the occupant rescue necessity information to the call center upon transmission of the emergency notification from the communication device.

An aspect of the disclosure provides a vehicle emergency notification system including a vehicle and a server apparatus provided in a call center. The vehicle emergency notification system is configured to transmit a call for service from the server apparatus to an emergency institution based on a situation where an emergency notification is transmitted from the vehicle to the call center. The vehicle includes a communication device, an information acquisition device, and a vehicle control processor. The communication device is configured to transmit the emergency notification from the vehicle to the call center. The information acquisition device is configured to acquire one or both of vehicle information regarding the vehicle and occupant information regarding an occupant of the vehicle. The vehicle control processor is configured to control each of the communication device and the information acquisition device, determine whether rescue of the occupant is necessary based on the vehicle information or the occupant information, and generate occupant rescue necessity information indicating whether the rescue of the occupant is necessary. When a conversation is not established between the occupant and the call center after a phone call is started between the vehicle and the call center via the communication device, the server apparatus is configured to determine whether the call for service is to be transmitted to the emergency institution based on the occupant rescue necessity information transmitted from the vehicle control processor to the call center via the communication device.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
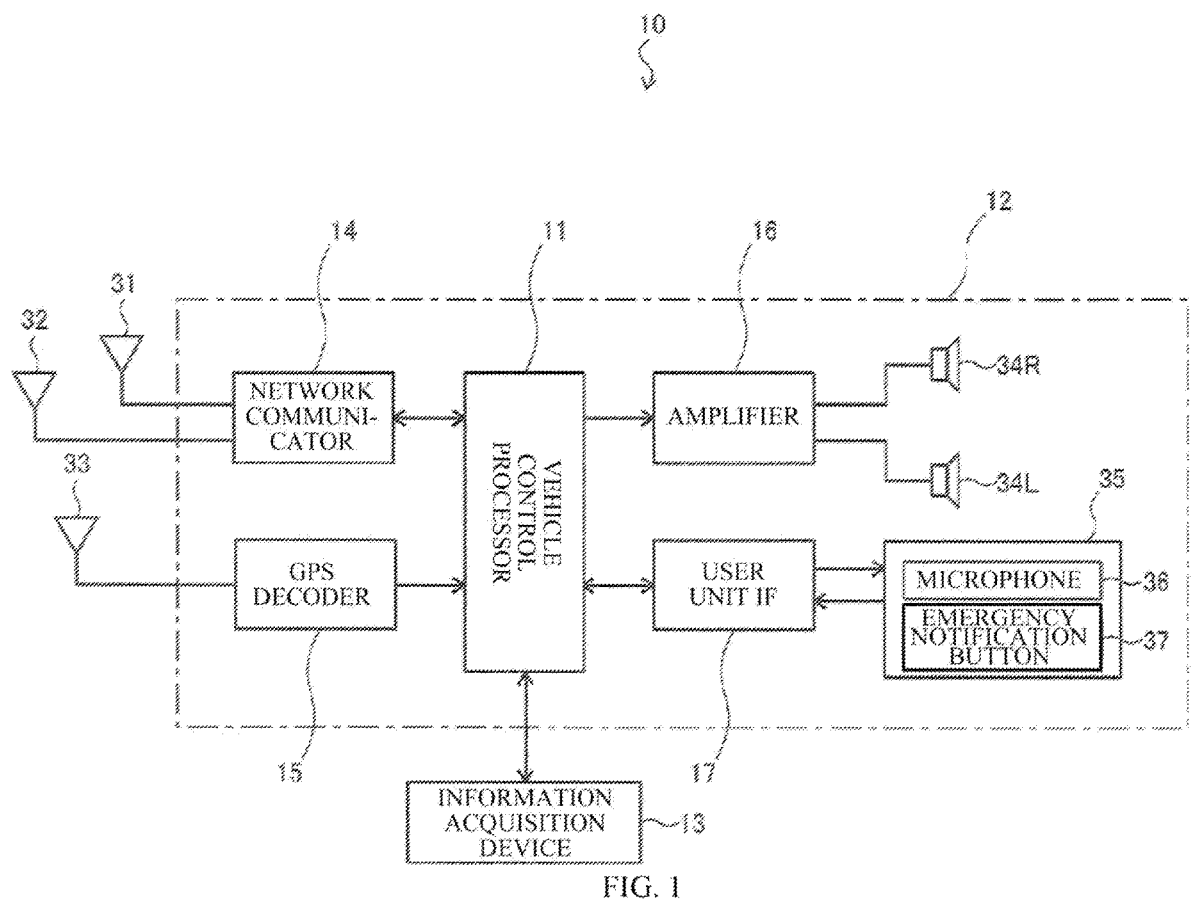
FIG. 1 is a block diagram of a vehicle emergency notification apparatus according to one example embodiment of the disclosure.

According to the urgent message system for a vehicle described in JP-A No. 2006-195580, an on-vehicle unit automatically transmits an urgent message to a center via a portable terminal device when a physical condition of the occupant is worse than a predetermined threshold. The on-vehicle unit transmits the detection data on the physical condition of the occupant together with the urgent message to the center. Accordingly, if the amount of the detection data is large, it can take a lot of time for the center to upload the detection data. Such long update time can hinder the center from immediately determining the current physical condition of the occupant, resulting in a delay in a transmission of the urgent message.

Further, when the detection data includes images or video of the faces of occupants of the vehicle, in particular, when the detection data includes an image of a passenger of the vehicle, for example, it is often the case that approvals for the transmission of personally identifiable information to the outside of the vehicle have not been gained. Accordingly, transmitting these images from the vehicle to the center is not appropriate in terms of personal information protection.

It is desirable to provide a vehicle emergency notification apparatus and a vehicle emergency notification system that enable a call center to determine whether a call for service is to be transmitted to an emergency institution based on occupant rescue necessity information received from a vehicle after receiving an emergency notification from the vehicle.

Now, a vehicle emergency notification apparatus 10 according to an example embodiment of the disclosure is described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. As used herein, the term "collision" may be used interchangeably with the term "contact".

Figure 2:
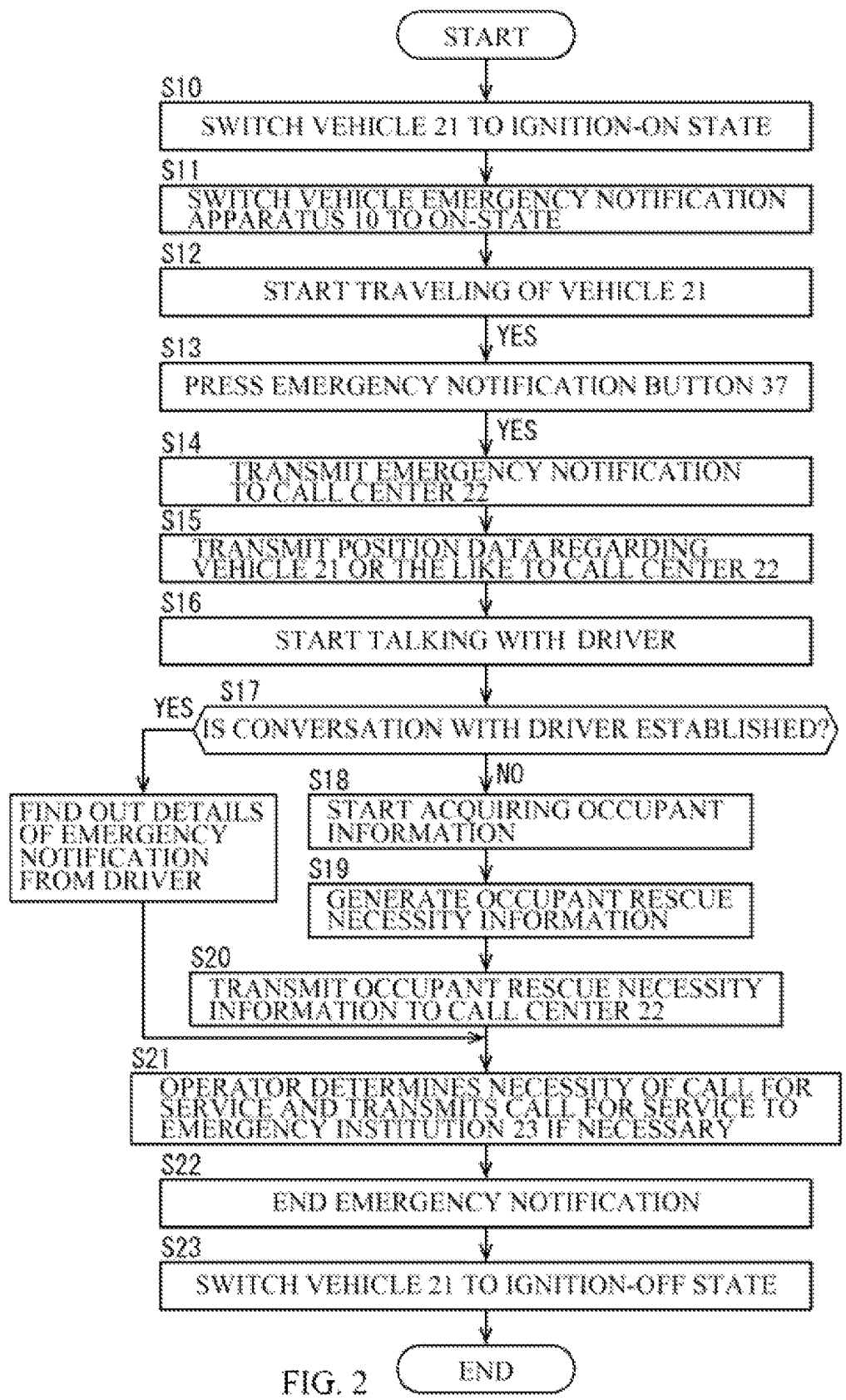
FIG. 2 is a flowchart illustrating a method of controlling an emergency notification manually issued by an occupant of a vehicle using the vehicle emergency notification apparatus according to one example embodiment of the disclosure.
Figure 3:
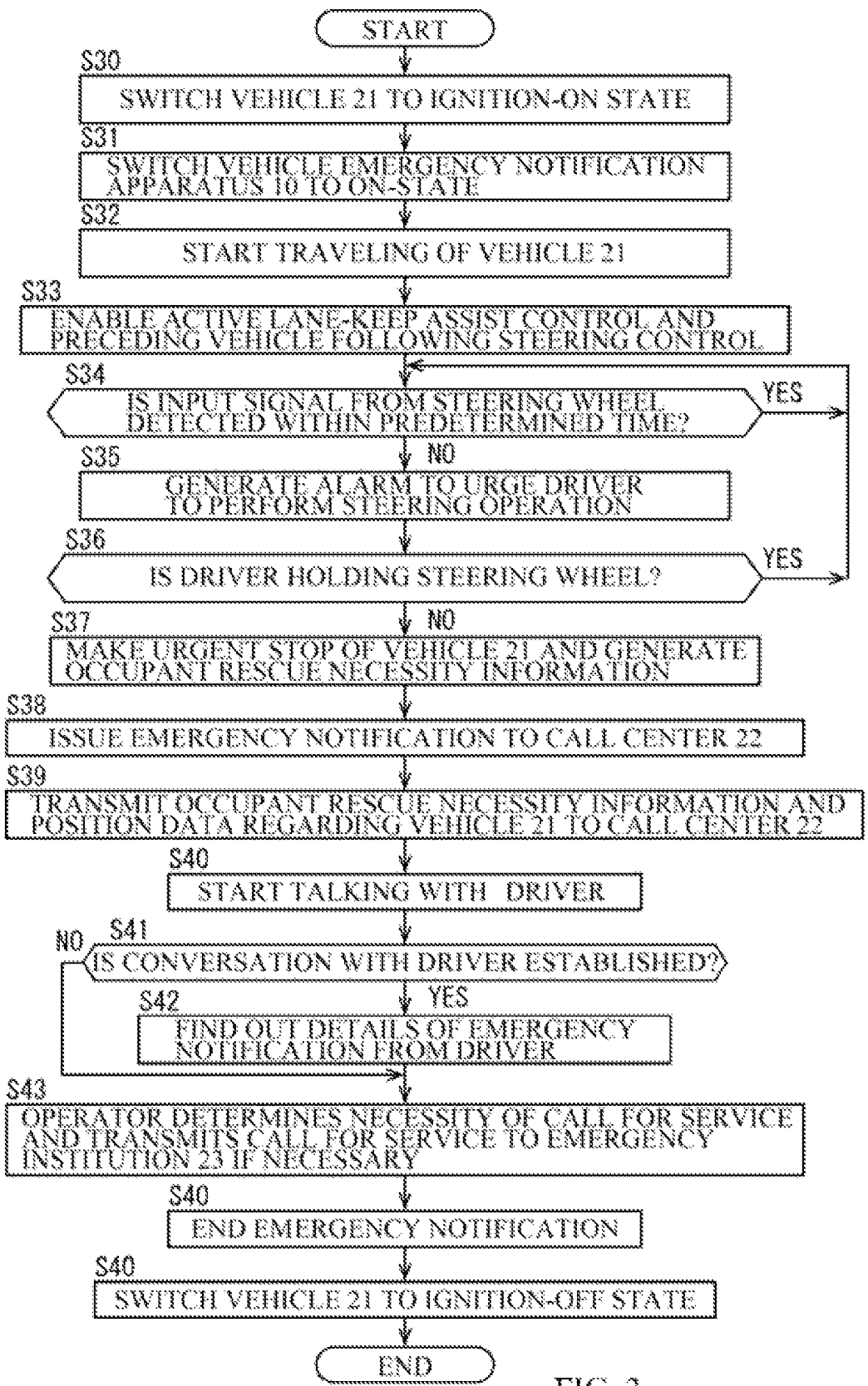
FIG. 3 is a flowchart illustrating a method of controlling an emergency notification automatically issued by the vehicle using the vehicle emergency notification apparatus according to one example embodiment of the disclosure.

FIG. 1 is a block diagram of the vehicle emergency notification apparatus 10. FIG. 2 is a flowchart illustrating a method of controlling an emergency notification manually issued by an occupant of the vehicle using the vehicle emergency notification apparatus 10 according to the example embodiment. FIG. 3 is a flowchart illustrating a method of controlling an emergency notification automatically issued by a vehicle control processor 11 of the vehicle emergency notification apparatus 10 according to the example embodiment.

The vehicle emergency notification apparatus 10 includes the vehicle control processor 11, a vehicle communication device 12, and an information acquisition device 13. The vehicle control processor transmits an emergency notification to a call center 22 (refer to FIG. 4) at the occurrence of a bad physical condition of the occupant or the like. In one embodiment, the vehicle communication device 12 may serve as a "communication device". The information acquisition device 13 acquires biological information regarding the occupant. The vehicle communication device 12 may be controlled by the vehicle control processor 11. The vehicle communication device 12 may include, for example, a network communicator 14, a GPS decoder 15, an amplifier 16, and a user unit interface 17.

The vehicle control processor 11 may include a central processing unit (CPU), a read-only memory (ROM), and a random-access memory (RAM), for example. The vehicle control processor 11 may be an electronic control unit (ECU) that includes one or more processors that execute various arithmetic operations to control the vehicle emergency notification apparatus 10, the vehicle communication device 12, and a non-illustrated driving device such as an engine.

The vehicle control processor 11 may include a non-illustrated memory. The memory may be a non-volatile memory such as an electrically erasable programmable read-only memory (EEPROM), for example. The memory may store various kinds of data necessary to control a vehicle 21 (refer to FIG. 4) and one or more programs to be executed by the one or more processors.

Figure 4:
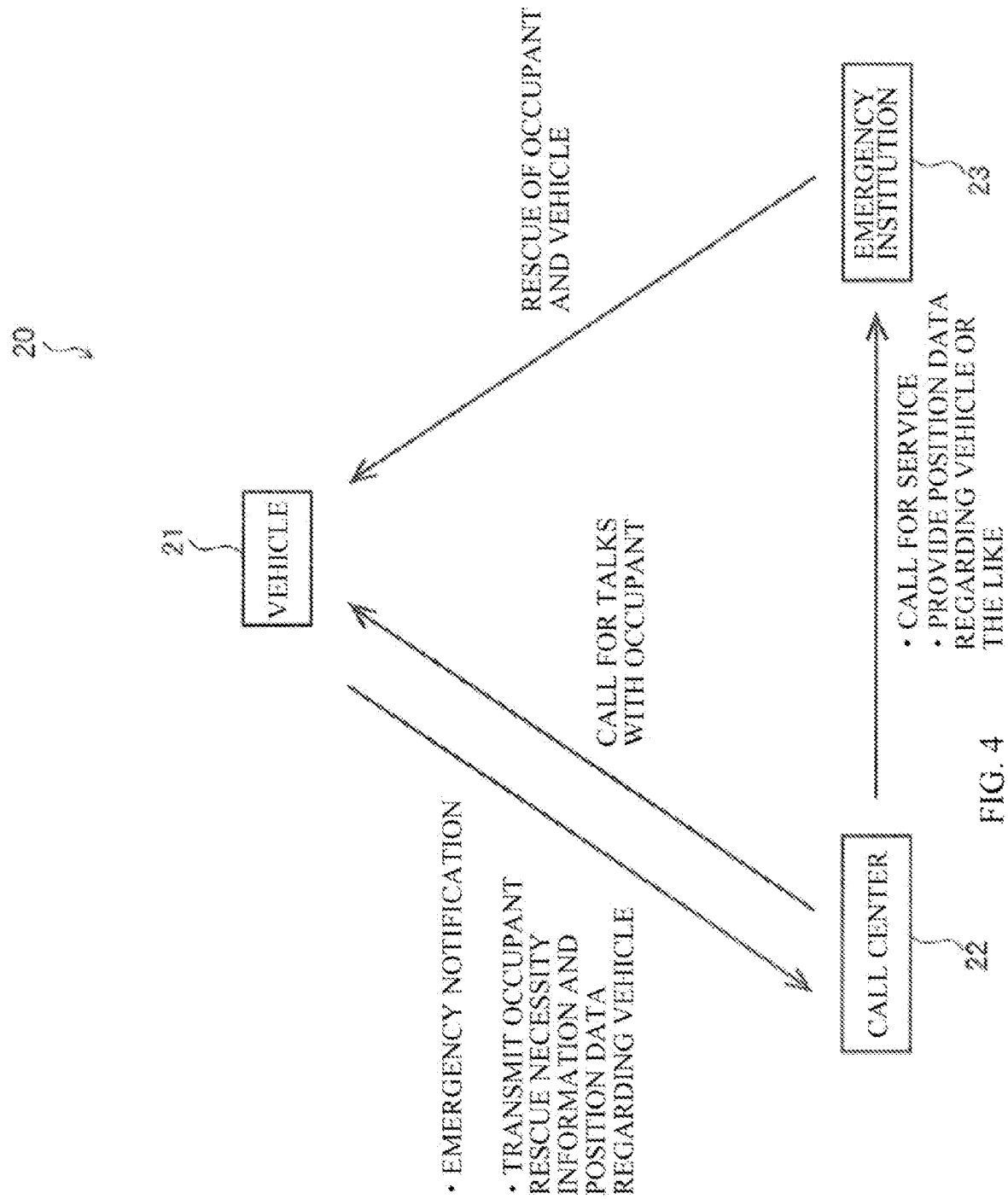
FIG. 4 is a schematic diagram illustrating a vehicle emergency notification system according to one example embodiment of the disclosure.

The network communicator 14 may perform a process adapted to establish data communication with a known telematics communication system via a main antenna 31 and a sub-antenna 32 provided on the vehicle 21 (refer to FIG. 4). The telematics communication system may be a communication service system that provides an emergency notification or the like to an individual vehicle (in this example, the vehicle 21) via communication between the individual vehicle (the vehicle 21) and a non-illustrated service provider.

The term "emergency notification" used herein may refer to a notification that is manually issued by the occupant or automatically issued by the vehicle 21 to the call center 22 (refer to FIG. 4) at the occurrence of a bad physical condition of the occupant of the vehicle 21 or the occurrence of a contact accident of the vehicle 21. When the emergency notification is received at the call center 22, a line of contact may open to enable the occupant to talk with an operator in the call center 22. The emergency notification may include current position data regarding the vehicle 21, occupant rescue necessity information, and other pieces of information to be transmitted to the call center 22.

The GPS decoder 15 may decode a signal received at a GPS antenna 33 to acquire the current position data regarding the vehicle 21. The current position data may be transmitted to the vehicle control processor 11 and stored in the memory of the vehicle control processor 11.

The amplifier 16 may convert sound data such as a talking sound or the like received from the vehicle control processor 11 into a sound signal, and may output the sound signal in the form of a sound from speakers 34L and 34R. For example, the vehicle control processor 11 may control the amplifier 16 so that a confirmation sound is outputted from the speaker 34L and 34R to check the state of consciousness of the occupant when the occupant rescue necessity information is to be generated.

The user unit interface 17 may transmit a signal between an occupant console 35 and the vehicle control processor 11. The occupant console 35 may include, for example, a microphone 36 and an emergency notification button 37 that are disposed in a vehicle compartment of the vehicle 21. The user unit interface 17 may convert a sound signal collected by the microphone 36 into sound data, and may send the sound data to the vehicle control processor 11. When the emergency notification button 37 is pressed by the occupant, the user unit interface 17 may send data signal indicating the operation of the emergency notification button 37 to the vehicle control processor 11.

The information acquisition device 13 may acquire occupant information to recognize a health condition or the like of the occupant of the vehicle 21. Additionally or alternatively, the information acquisition device 13 may acquire vehicle information to recognize a traveling state or the like of the vehicle 21.

For example, the information acquisition device 13 may acquire the occupant information using an imaging device disposed in the vehicle compartment of the vehicle 21 or a steering wheel detector that detects an operation of a steering wheel, for example. The imaging device may be a camera module that includes an image sensor such as a CCD or CMOS. The imaging device may be coupled to the vehicle control processor 11 via an in-vehicle network. The steering wheel detector may include, for example, a steering pressure sensor or a steering angle sensor to detect whether the steering wheel is held by a driver who drives the vehicle 21 and an operational state of the steering wheel. Like the imaging device, the steering wheel detector may be coupled to the vehicle control processor 11 via the in-vehicle network.

The information acquisition device 13 may capture an image of the occupant using the imaging device to acquire the occupant information including data on the opening degree of the eyes of the occupant, data on an angle of the head of the occupant, and data on the iris of the occupant, for example. The information acquisition device 13 may transmit the occupant information to the vehicle control processor 11. Thereafter, the occupant information may be stored in the memory of the vehicle control processor 11.

The information acquisition device 13 may acquire the vehicle information using a contact detector that detects contact of the vehicle 21, for example. The contact detector may include various sensors that detect contact of the vehicle 21, such as a contact pressure sensor and an acceleration sensor. The contact detector may be coupled to the vehicle control processor 11 via the in-vehicle network.

The information acquisition device 13 may acquire the vehicle information regarding whether the vehicle 21 is able to travel by detecting contact of the vehicle 21 using the contact detector described above. The information acquisition device 13 may transmit the vehicle information to the vehicle control processor 11. Thereafter, the vehicle information may be stored in the memory of the vehicle control processor 11.

The vehicle 21 may include a driver monitoring system (hereinafter referred to as a DMS) that recognizes the driver's face to provide a warning about inattentive driving of the driver, a drowsy state of the driver, or drowsy driving of the driver. The DMS may include an imaging device provided on an inner side of the steering wheel, for example. The imaging device may capture an image of the driver's face. Alternatively, the information acquisition device 13 may be used as the DMS.

The method of controlling the emergency notification manually issued by the occupant using the vehicle emergency notification apparatus 10 according to the example embodiment will now be described with reference to FIG. 2. In the example embodiment, the occupant of the vehicle 21 may be the driver who drives the vehicle 21. However, the occupant of the vehicle 21 is not limited to the driver. The occupant of the vehicle 21 may be a passenger seated in a front passenger seat or a rear seat of the vehicle 21, for example.

As illustrated in FIG. 2, the driver may board the vehicle 21 and press a non-illustrated ignition switch in Step S10. The vehicle 21 may be thereby switched to an ignition-on state. Thereafter, in Step S11, the vehicle emergency notification apparatus 10 of the vehicle 21 may also be switched to an on-state in response to the pressing operation on the ignition switch.

In Step S12, the vehicle control processor 11 may start up a non-illustrated vehicle drive mechanism such as an engine, and the driver may start traveling of the vehicle 21 by operating the steering wheel, for example.

In Step S13, the driver may manually press the emergency notification button 37 mounted on the vehicle 21 in a case where the physical condition of the driver takes a sharp turn for the worse during the traveling of the vehicle 21 and where it is difficult for the driver to call the fire station to ask for service using a smartphone or the like held by the driver.

In Step S14, the vehicle control processor 11 may control the network communicator 14 so that an emergency notification is transmitted to the call center 22. Note that a contact address of the call center 22 may be stored in the vehicle 21 in advance. When the emergency notification button 37 is pressed, the vehicle 21 may make a phone call to the call center 22.

In Step S15, the vehicle control processor 11 may control the network communicator 14 so that information indicating that the emergency notification has been manually issued by the occupant, and own vehicle information regarding the vehicle 21 (hereinafter also referred to as an own vehicle) are transmitted to the call center 22. The own vehicle information may include data on a position of the own vehicle, data on the registration number of the own vehicle, and data on the type of the own vehicle. When detecting the pressing operation on the emergency notification button 37, the vehicle control processor 11 may control the GPS decoder 15 to acquire the data on a position of the own vehicle and store the data on the memory, as described above. Note that the own vehicle information necessary for the emergency notification may be stored in the memory of the vehicle control processor 11 in advance. The own vehicle information may include the data on the registration number of the own vehicle and the data on the type of the own vehicle. Alternatively, the own vehicle information may be stored in a server apparatus of the call center 22 in advance.

In Step S16, the operator in the call center 22 may receive the phone call which is the emergency notification from the vehicle 21 and start talking with the driver of the vehicle 21.

In Step S17, the operator may call for talks with the driver of the vehicle 21. When a conversation is established between the operator and the driver (Step S17: YES), the operator may find out the details of the emergency notification from the driver, following which the flow may proceed to Step S21 described below.

In contrast, when the driver does not respond to a call from the operator and a conversation is not established between the operator and the driver (Step S17: NO), the flow may proceed to Step S18.

In this case, the vehicle control processor 11 may control the user unit interface 17 to make a phone call to the call center 22. When a sound or voice of the driver inputted received by the microphone 36 is not detected, the vehicle control processor 11 may determine that the driver is unconscious, immediately after receiving the emergency notification.

In Step S18, the vehicle control processor 11 may control the information acquisition device 13 to acquire the occupant information regarding the driver of the vehicle 21. As described above, the imaging device of the DMS may be used as the information acquisition device 13, for example. The information acquisition device 13 may capture images of the head or the face of the driver to acquire the occupant information on the opening degree of the eyes of the driver, the angle of the head of the driver, and the iris of the driver, for example. Thereafter, the information acquisition device 13 may transmit the occupant information to the vehicle control processor 11. The vehicle control processor 11 may store the occupant information in the memory.

In Step S19, the vehicle control processor 11 may compare the occupant information stored in the memory with a predetermined threshold to determine whether rescue of the driver is necessary. For example, in a case where the occupant information is information on the opening degree of the eyes of the driver and where the opening degree of the eyes of the driver is 40% or less of the full opening degree, the vehicle control processor 11 may determine that a possibility of the driver being unconscious is high and that the rescue of the driver is necessary.

In a case where the occupant information is information on the angle of the head of the driver and where the angle of the driver is 20 degrees or greater with respect to a vertical direction, the vehicle control processor 11 may determine that the driver is not able to visually recognize the environment in front of the vehicle 21 and thus the possibility of the driver being unconscious is high, and that the rescue of the driver is necessary.

When it is determined that the rescue of the driver is necessary, the vehicle control processor 11 may generate, as the occupant rescue necessity information, a flag which is set to 1. In contrast, when it is determined that the rescue of the driver is unnecessary, the vehicle control processor 11 may generate, as the occupant rescue necessity information, a flag which is set to 0. Thereafter, the vehicle control processor 11 may store the flag in the memory.

In Step S20, the vehicle control processor 11 may control the network communicator 14 to transmit the flag to the call center 22. The transmission of the flag may not take a lot of time because the flag is one-bit data which indicates 1 or 0. This enables the operator to confirm the flag at an early timing after the emergency notification is issued. Further, the transmission of the flag is preferable in terms of personal information protection because the flag includes no image or no video which identifies the driver or passenger.

In Step S21, the operator in the call center 22 (the server apparatus in the call center 22) may determine whether a call for service is to be transmitted to an emergency institution 23 based on the flag received from the vehicle 21 even when the driver is unable to talk with the operator. When the flag is set to 1, the operator may determine that the possibility of the driver being unconscious is high, and may transmit a call for service to the fire station. At this time, the operator may send the position data regarding the vehicle 21 acquired in Step S15 together with the information indicating that the possibility of the driver being unconscious is high.

In contrast, when the flag is set to 0, the operator may determine that the possibility of the emergency notification button 37 having been unintentionally or mischievously pressed by the driver is high and that transmission of the call for service is unnecessary. In this case, the operator may refrain from transmitting a call for service.

When the conversation is established between the operator and the driver (Step S17: YES), the operator may find out the health condition of the driver directly from the driver and determine whether a call for service is to be transmitted to the emergency institution 23.

In Step S22, the operator may hang up the phone to end the emergency notification. Thereafter, the driver may reach a destination, stop the vehicle 21 in a parking lot or the like, and press the ignition switch to switch the vehicle 21 to an ignition-off state in Step S23.

According to the vehicle emergency notification apparatus 10 of the example embodiment, the vehicle control processor 11 may control the information acquisition device 13 to acquire the occupant information on the opening degree of the eyes of the driver or the like after the emergency notification button 37 is manually pressed by the driver. Thereafter, the vehicle control processor 11 may generate the occupant rescue necessity information from the occupant information. According to the control method described above, the occupant rescue necessity information may be generated based on the state of consciousness of the driver detected immediately after the emergency notification button 37 is pressed. As a result, the operator in the call center 22 (the server apparatus in the call center 22) makes it possible to accurately determine whether a call for service is to be transmitted to the emergency institution 23 even when the driver is unconscious.

Note that the disclosure is not limited to the example embodiment in which the vehicle control processor 11 generates the occupant rescue necessity information after the emergency notification button 37 is pressed. Alternatively, the vehicle control processor 11 may generate the occupant rescue necessity information based on the occupant information acquired by the information acquisition device 13 after the vehicle 21 starts traveling and before the emergency notification button 37 is pressed. In this case, the vehicle control processor 11 may repeatedly generate the occupant rescue necessity information while the vehicle 21 is traveling and may store the occupant rescue necessity information in the memory. After the emergency notification button 37 is pressed, the vehicle control processor 11 may transmit the latest occupant rescue necessity information together with the position data regarding the vehicle 21 to the call center 22.

Next, the method of controlling an emergency notification automatically issued by the vehicle control processor 11 of the vehicle emergency notification apparatus 10 according to the example embodiment is described with reference to FIG. 3. In the example embodiment, the occupant of the vehicle 21 may be the driver who drives the vehicle 21. However, the occupant of the vehicle 21 is not limited to the driver. The occupant of the vehicle 21 may be a passenger seated in the front passenger seat or the rear seat of the vehicle 21, for example.

As illustrated in FIG. 3, the driver may board the vehicle 21 and press the non-illustrated ignition switch in Step S30. The vehicle 21 may be thereby switched to the ignition-on state. Thereafter, in Step S31, the vehicle emergency notification apparatus 10 of the vehicle 21 may also be switched to the on-state in response to the pressing operation on the ignition switch.

In Step S32, the vehicle control processor 11 may start up the non-illustrated vehicle drive mechanism such as the engine, and the driver may start traveling of the vehicle 21 by operating the steering wheel, for example. Thereafter, in Step S33, the driver may enable driver assistance control such as active lane-keep assist control and preceding vehicle following steering control while the vehicle 21 is traveling.

In Step S34, the vehicle control processor 11 may detect an input signal received from the steering pressure sensor or the steering angle sensor to determine whether the driver is holding the steering wheel while the vehicle 21 is traveling.

When the input signal from the steering wheel is not detected within a predetermined time, the vehicle control processor 11 may determine that the driver is not holding the steering wheel (Step S34: NO), following which the flow may proceed to Step S35.

In contrast, when the input signal from the steering wheel is detected within the predetermined time, the vehicle control processor 11 may determine that the driver is holding the steering wheel (Step S34: YES), and may continue to monitor the input signal from the steering wheel.

In Step S35, the vehicle control processor 11 may control the amplifier 16 to generate an alarm to urge the driver to hold the steering wheel and perform a driving operation of the vehicle 21. In Step S36, the vehicle control processor 11 may detect the input signal from the steering wheel again to determine whether the driver is holding the steering wheel.

When the input sent from the steering wheel is not detected within the predetermined time (Step S36: NO), the vehicle control processor 11 may determine that the driver is unconscious, following which the flow may proceed to Step S37.

In contrast, when the input signal from the steering wheel is detected within the predetermined time (Step S36: YES), the vehicle control processor 11 may determine that the driver is holding the steering wheel and may continue to monitor the input signal from the steering wheel.

In Step S37, the vehicle control processor 11 may control the vehicle drive mechanism so that the vehicle 21 makes an urgent stop on the current lane while outputting a sound from a horn of the vehicle 21 and illuminating a hazard lamp of the vehicle 21. In addition, the vehicle control processor 11 may generate the flag which is set to 1 as the occupant rescue necessity information, and thereafter store the flag in the memory.

In Step S38, the vehicle control processor 11 may control the network communicator 14 to automatically issue an emergency notification to the call center 22. As described above, the contact address of the call center 22 may be stored in the vehicle 21 in advance, and the vehicle 21 may make a phone call to the call center 22.

In Step S39, the vehicle control processor 11 may control the network communicator 14 so that the information indicating that the emergency notification has been issued automatically, and the own vehicle information including the position, the registration number, and the type of the vehicle 21 are transmitted together with the flag which is set to 1 to the call center 22. As described above, the vehicle control processor 11 may control the GPS decoder 15 to acquire the position data regarding the own vehicle and store the data on the memory.

In Step S40, the operator in the call center 22 may receive the phone call which is the emergency notification from the vehicle 21 and start talking with the driver of the vehicle 21.

In Step S41, the operator may call for talks with the driver of the vehicle 21. When the driver regains consciousness and a conversation is established between the operator and the driver (Step S41: YES), the operator may find out the details of the emergency notification from the driver in Step S42, following which the flow may proceed to Step S43.

When the conversation is established between the operator and the driver (Step S41: YES), the operator may find out the health condition of the driver directly from the driver and determine whether a call for service is to be transmitted to the emergency institution 23 in Step S43. In contrast, in a case where the conversation is not established between the operator and the driver (Step S41: NO) and where the flag set to 1 is transmitted from the vehicle 21, the operator in the call center 22 may determine that the possibility of the driver being unconscious is high and transmit a call for service to the fire station. In this case, the operator may send the position data regarding the vehicle 21 acquired in Step S39 together with the information indicating that the possibility of the driver being unconscious is high.

In Step S44, the operator may hang up the phone to end the emergency notification. Thereafter, the driver may drive the vehicle 21 to the destination, if possible, stop the vehicle 21 in a parking lot or the like, and press the ignition switch to switch the vehicle 21 to the ignition-off state in Step S45. In contrast, when the driver is taken to the hospital, a rescue worker or the like may move the vehicle 21 to a safety area such as a road shoulder and press the ignition switch of the vehicle 21 to switch the vehicle 21 to the ignition-off state.

According to the vehicle emergency notification apparatus 10 of the example embodiment, the vehicle control processor 11 may generate and transmit the occupant rescue necessity information to the call center 22 also when the emergency notification is automatically issued by the vehicle 21. According to the control method, the operator in the call center 22 (the server apparatus in the call center 22) makes it possible to accurately determine whether a call for service is to be transmitted to the emergency institution 23 even when the driver is unconscious.

Now, a vehicle emergency notification system 20 according to another example embodiment of the disclosure will be described in detail with reference to the accompanying drawings. Note that in the following description, the same components as those of the vehicle emergency notification apparatus 10 described with reference to FIGS. 1 to 3 are denoted by the same reference numerals as those of the vehicle emergency notification apparatus 10 to omit duplicate description. FIG. 4 schematically illustrates the vehicle emergency notification system 20 according to the example embodiment.

As illustrated in FIG. 4, the vehicle emergency notification system 20 includes a vehicle 21 that includes the vehicle emergency notification apparatus 10, the call center 22 (the server apparatus in the call center 22) that receives an emergency notification from the vehicle 21, and the emergency institution 23 that receives a call for service from the call center 22.

As described above with reference to FIGS. 1 to 3, in a case where the physical condition of the driver or the occupant of the vehicle 21 takes a sharp turn for the worse during traveling of the vehicle 21 and where it is difficult for the driver to call the fire station to ask for service, the driver may manually press the emergency notification button 37 to transmit an emergency notification from the vehicle 21 to the call center.

The operator in the call center 22 may receive the emergency notification and start talking with the driver of the vehicle 21. When a conversation with the driver of the vehicle 21 is not established, the vehicle control processor 11 of the vehicle 21 may generate and transmit the occupant rescue necessity information to the call center 22 as in the control method described above with reference to FIG. 2. Accordingly, the operator (the server apparatus in the call center 22) makes it possible to determine whether a call for service is to be transmitted to the emergency institution 23 based on the occupant rescue necessity information even when the conversation with the driver is not established.

An emergency notification unintentionally or mischievously transmitted from the vehicle 21 to the call center 22 may be excluded as the notification not to cope with at the call center 22. This allows the emergency institution 23 to come to the aid of the driver only when the rescue is actually needed.

In the description of the vehicle emergency notification apparatus 10 and the vehicle emergency notification system 20 according to the foregoing example embodiments, the call for service may be transmitted from the call center 22 to the fire station which is the emergency institution 23; however, this is a non-limiting example. For instance, when the vehicle 21 is tailgated by another vehicle, a call for service may be transmitted to the police station instead of the fire station which is the emergency institution 23.

In addition, in the description of the vehicle emergency notification apparatus 10 and the vehicle emergency notification system 20 according to the foregoing example embodiments, the vehicle control processor 11 may generate the occupant rescue necessity information from the occupant information acquired by the information acquisition device 13; however, this is a non-limiting example. Alternatively, the vehicle control processor 11 may generate the occupant rescue necessity information from the vehicle information acquired by the information acquisition device 13, for example. In this case also, the operator in the call center 22 (the server apparatus in the call center 22) makes it possible to determine whether a call for service is to be sent to the emergency institution 23 based on the occupant rescue necessity information even when the conversation with the occupant of the vehicle 21 is not established. It is to be noted that various modifications may be made without departing from the gist of the disclosure.

The invention claimed is:

1. A vehicle emergency notification apparatus to be applied to a vehicle, the vehicle emergency notification apparatus comprising:
a vehicle control processor configured to:
control an information acquisition device to acquire at least one of vehicle information regarding the vehicle or occupant information regarding an occupant of the vehicle,
determine whether rescue of the occupant is necessary based on at least one of the vehicle information or the occupant information, and generate occupant rescue necessity information indicating whether the rescue of the occupant is necessary,
control a communication device of the vehicle to transmit an emergency notification from the vehicle to a call center to start a phone call with the call center, and
after the phone call is started between the vehicle and the call center via the communication device, transmit the occupant rescue necessity information to the call center,
when a conversation is not established between the occupant and the call center after the phone call is started, the phone call is determined by a server apparatus about whether to be transmitted to an emergency institution based on the occupant rescue necessity information received from the vehicle control processor, the server apparatus being provided in the call center.

2. The vehicle emergency notification apparatus according to claim 1, wherein,
when a voice of the occupant which corresponds to the occupant information is not acquired by the information acquisition device after the phone call is manually started by the occupant between the vehicle and the call center via the communication device, the vehicle control processor is configured to generate the occupant rescue necessity information and transmit the occupant rescue necessity information to the call center after the emergency notification is transmitted from the communication device.

3. The vehicle emergency notification apparatus according to claim 2, wherein the vehicle emergency notification apparatus comprises the information acquisition device,
the information acquisition device comprises an imaging device configured to capture an image of an interior of the vehicle, and
the imaging device is configured to generate data on an image capturing the occupant as the occupant information.

4. The vehicle emergency notification apparatus according to claim 1, wherein the vehicle emergency notification apparatus comprises the information acquisition device,
the information acquisition device comprises an imaging device configured to capture an image of an interior of the vehicle, and
the imaging device is configured to generate data on an image capturing the occupant as the occupant information.

5. The vehicle emergency notification apparatus according to claim 1, wherein the occupant rescue necessity information indicating whether transmitting the phone call from the call center to an emergency institution is necessary.

6. The vehicle emergency notification apparatus according to claim 1, wherein the vehicle control processor is configured to determine whether the rescue of the occupant is necessary by comparing the occupant information with a predetermined threshold.

7. The vehicle emergency notification apparatus according to claim 1, wherein the vehicle control processor is configured to generate a flag as the occupant rescue necessity information.

8. The vehicle emergency notification apparatus according to claim 1, wherein the occupant rescue necessity information is not associated with personal information identifying the occupant.

9. A vehicle emergency notification system comprising:
a vehicle; and
a server apparatus provided in a call center, wherein
the vehicle emergency notification system is configured to determine whether to transmit a call for service from the server apparatus to an emergency institution based on a situation after an emergency notification is transmitted from the vehicle to the call center,
the vehicle comprises
a vehicle control processor configured to,
control an information acquisition device to acquire at least one of vehicle information regarding the vehicle or occupant information regarding an occupant of the vehicle,
determine whether rescue of the occupant is necessary based on at least one of the vehicle information or the occupant information, and generate occupant rescue necessity information indicating whether the rescue of the occupant is necessary,
control a communication device of the vehicle to transmit the emergency notification from the vehicle to the server apparatus to start a phone call with the call center,
after the phone call is started between the vehicle and the call center via the communication device and the server apparatus, transmit the occupant rescue necessity information to the server apparatus, and,
when a conversation is not established between the occupant and the call center after the phone call is started, the server apparatus is configured to determine whether the call for service is to be transmitted to the emergency institution based on the occupant rescue necessity information received from the vehicle control processor.

10. The vehicle emergency notification system according to claim 9, wherein the occupant rescue necessity information indicating whether transmitting the call from the call center to an emergency institution is necessary.

11. The vehicle emergency notification system according to claim 9, wherein the vehicle control processor is configured to determine whether the rescue of the occupant is necessary by comparing the occupant information with a predetermined threshold.

12. The vehicle emergency notification system according to claim 9, wherein the vehicle control processor is configured to generate a flag as the occupant rescue necessity information.

13. The vehicle emergency notification system according to claim 9, wherein the occupant rescue necessity information is not associated with personal information identifying the occupant.

14. The vehicle emergency notification system according to claim 9, wherein when a voice of the occupant which corresponds to the occupant information is not acquired by the information acquisition device after the phone call is manually started by the occupant between the vehicle and the call center via the communication device, the vehicle control processor is configured to generate the occupant rescue necessity information and transmit the occupant rescue necessity information to the call center after the emergency notification is transmitted from the communication device.

15. The vehicle emergency notification system according to claim 9, wherein the vehicle comprises the information acquisition device, wherein,
- the information acquisition device comprises an imaging device configured to capture an image of an interior of the vehicle, and
- the imaging device is configured to generate data on an image capturing the occupant as the occupant information.

* * * * *